United States Patent
Takahashi et al.

(10) Patent No.: US 7,680,506 B2
(45) Date of Patent: Mar. 16, 2010

(54) METHOD FOR INSERTING ADVERTISEMENT INTO POC AND EXTENDED-POC COMMUNICATION SYSTEM

(75) Inventors: Kazuhiro Takahashi, Tokyo (JP); Yoshihiro Ono, Tokyo (JP); Shin Harada, Tokyo (JP); Takashi Shiraki, Tokyo (JP); Takehiko Kashiwagi, Tokyo (JP); Junpei Kamimura, Tokyo (JP)

(73) Assignee: NEC Corporation, Tokyo (JP)

( * ) Notice: Subject to any disclaimer, the term of this patent is extended or adjusted under 35 U.S.C. 154(b) by 565 days.

(21) Appl. No.: 11/712,493

(22) Filed: Mar. 1, 2007

(65) Prior Publication Data

US 2007/0243893 A1  Oct. 18, 2007

(30) Foreign Application Priority Data

Mar. 14, 2006  (JP)  .............................. 2006-069059

(51) Int. Cl.
*H04B 7/00* (2006.01)
(52) U.S. Cl. ..................... 455/518; 455/519; 455/3.01; 455/507
(58) Field of Classification Search .................. 455/518, 455/519, 3.06, 3.01, 414.1, 90.3, 90.2, 95, 455/127.4, 507; 370/310; 709/204
See application file for complete search history.

(56) References Cited

U.S. PATENT DOCUMENTS

| | | | |
|---|---|---|---|
| 6,788,946 B2 | 9/2004 | Winchell et al. | |
| 2004/0059631 A1* | 3/2004 | Amano | 705/14 |
| 2005/0122922 A1* | 6/2005 | Wu et al. | 370/310 |
| 2005/0122923 A1* | 6/2005 | Jang et al. | 370/310 |
| 2005/0195955 A1 | 9/2005 | Amano et al. | |
| 2005/0202838 A1 | 9/2005 | Hiller et al. | |
| 2005/0267936 A1* | 12/2005 | Poikselka | 709/204 |
| 2006/0040688 A1* | 2/2006 | Kuroda et al. | 455/518 |
| 2006/0046759 A1 | 3/2006 | Yoon et al. | |
| 2006/0084454 A1* | 4/2006 | Sung et al. | 455/518 |

FOREIGN PATENT DOCUMENTS

| | | |
|---|---|---|
| EP | 1 094 413 A2 | 4/2001 |
| JP | 2001-118006 | 4/2001 |
| JP | 2002-169764 | 6/2002 |
| JP | 2003-283652 | 10/2003 |
| JP | 2005-500714 A | 1/2005 |
| JP | 2005-244521 | 9/2005 |
| JP | 2005-260973 | 9/2005 |
| JP | 2006-054656 A | 2/2006 |
| WO | WO 2004/086715 A1 | 10/2004 |

* cited by examiner

*Primary Examiner*—Tan Trinh
(74) *Attorney, Agent, or Firm*—Foley & Lardner LLP

(57) ABSTRACT

The object of the present invention is to realize a method and a server which enable insertion of advertisement even in voice communication including multimedia communication. The server is configured as a server for managing PoC communication among multiple terminals, comprising: a right-to-speak management section for managing the right to speak of the multiple terminals; a data distribution section for transmitting and receiving data to and from the multiple terminals; and an advertisement control section for storing advertisement data and transmitting the stored advertisement data to the multiple terminals via the data distribution section.

12 Claims, 8 Drawing Sheets

METHOD FOR INSERTING ADVERTISEMENT INTO POC AND EXTENDED-POC COMMUNICATION SYSTEM

BACKGROUND OF THE INVENTION

1. Field of the Invention

The present invention relates to PoC (Push To Talk over Cellular) and extended-PoC communication system, and in particular to a method and a server which enable insertion of advertisements.

2. Description of the Related Art

PoC communication is communication using SIP (RFC 3216), which is an Internet protocol, and it enables communication among groups using a mobile phone network. The PoC communication is disclosed, for example, in Japanese Patent Laid-Open No. 2005-260973.

In a PoC communication system, there are multiple terminals connected to a PoC server to transmit and receive voice via half-duplex communication.

When transmission is performed, the terminal first requests the right to speak from the PoC server. The PoC server determines whether or not to approve the right to speak in a separately determined procedure. If the right to speak is to be approved, then it is issued to the terminal. Upon receiving the right to speak, the terminal transmits voice speech to the PoC server. To such terminals that do not have the right to speak, speech is transmitted from the PoC server. In this way, voice communication among multiple terminals is realized via half-duplex communication.

PoC can realize voice communication among two or more terminals by effectively utilizing a relatively narrow communication band, and it has attracted a lot of attention recently. International standardization of PoC is being promoted, and it is expected that PoC will become wide spread in the future. The result of PoC standardization activities by OMA (Open Mobile Alliance) is provided on the site: http://www.openmobilealliance.org/release_program/poc-v1_0.html.

A lot of services and content are provided free on the Web. For most of them, a business model called an advertisement model is adopted. This is a model for acquiring advertisement revenue by displaying advertisement on a part of the display area of a browser or by inserting advertisement copy in an e-mail, and there are various variations of this model.

However, this kind of advertisement model is hardly used in voice communication including telephone communication. Only a model in which a voice advertisement is inserted before the start of conversation has been implemented.

This is because determination of the position or the timing of inserting advertisement after start of the conversation is very difficult. Insertion after start of conversation may often interfere with the conversation itself, and as a result, the user feels uncomfortable, and the advertisement effect is negated. In the case of a model in which the advertisement is inserted at the beginning of a conversation, a problem occurs in that, when the conversation time becomes long, there will be a large gap between the benefit that the ad will created and the amount of advertisement.

An advertisement model is often effective for promoting of a service. However, in voice communication, there is a problem that the advertisement model has not been effectively utilized.

SUMMARY OF THE INVENTION

The present invention has been made in consideration of the problems of the conventional techniques described above, and its object is to realize a method and a server which enable insertion of advertisements even in voice communication including multimedia communication.

The server which realizes the method of the present invention is a server for managing PoC communication among multiple terminals, comprising:

a right-to-speak management section for managing the right to speak of the multiple terminals;

a data distribution section for transmitting and receiving data to and from the multiple terminals; and an advertisement control section for storing advertisement data and transmitting the stored advertisement data to the multiple terminals via the data distribution section.

In this case, it is possible that, when receiving speech data by any of the multiple terminals ends, the data distribution section transmits an end-of-speech notification to that effect to the advertisement control section, and when accepting advertisement data from the advertisement control section, the data distribution section transmits the advertisement data to each of the multiple terminals;

and that when accepting the end-of-speech notification, the advertisement control section causes the right-to-speak management section to suspend a response to the request for the right to speak by each terminal and transmits the stored advertisement data to the data distribution section.

It is also possible that, when a PoC communication session is started, the advertisement control section causes the right-to-speak management section to suspend a response to the right to speak of the multiple terminals and transmits the stored advertisement data to the data distribution section;

and that when accepting the advertisement data from the advertisement control section, the data distribution section transmits the advertisement data to each of the multiple terminals.

It is also possible that, when issuing the right to speak to any of the multiple terminals, the right-to-speak management section transmits a right-to-speak issue notification to that effect to the advertisement control section;

when accepting the right-to-speak issue notification, the advertisement control section transmits the stored advertisement data to the data distribution section;

and that when accepting the advertisement data from the advertisement control section, the data distribution section transmits the advertisement data and speech data from the terminal to which the right to speak has been issued to each of the terminals other than the terminal to which the right to speak has been issued.

It is also possible that, when issuing the right to speak to any of the multiple terminals, the right-to-speak management section transmits a right-to-speak issue notification to that effect to the advertisement control section;

that when receiving of speech data by any of the multiple terminals ends, the data distribution section transmits an end-of-speech notification to that effect to the advertisement control section, and when accepting advertisement data from the advertisement control section, the data distribution section transmits the advertisement data to each of the multiple terminals;

and that if the right-to-speak issue notification is not accepted even when a predetermined time has lapsed after acceptance of the end-of-speech notification, the advertisement control section requests the right to speak from the right-to-speech management section, and transmits the stored advertisement data to the data distribution section if the right to speak has been acquired.

In any of the situations described above, it is also possible that advertisement data includes picture data, and the data distribution section specifies a medium which is not used by the PoC communication and transmits the advertisement data to each terminal.

The present invention provides a method for inserting an advertisement while preventing interference with communication, by effectively utilizing the mechanism of controlling the right to speak, which is the characteristic of PoC, in PoC and extended-PoC communication systems.

In PoC, conversation is controlled by the right to speak. The advertisement insertion timing is controlled by using information about the right to speak. A terminal which has acquired the right to speak transmits speech. When this transmission ends, no one can transmit speech until any terminal acquires the right to speak. Therefore, after delivery of speech ends, the advertisement control server instructs the right-to-speech management section to temporarily stop issuing the right to speak and then instructs the voice media distribution section to transmit the advertisement. When transmission of the advertisement ends, the advertisement control server allows the right-to-speak management section to issue the right to speak to a terminal.

As described above, according to the present invention, it is possible to determine the advertisement insertion timing by monitoring PoC control signals; it is also possible to insert an advertisement by controlling management of the right to speak; and it is also possible to effectively insert an advertisement while preventing a disagreeable feeling from being given to a user.

The above and other objects, features, and advantages of the present invention will become apparent from the following description with reference to the accompanying drawings which illustrate examples of the present invention.

DETAILED DESCRIPTION OF THE PREFERRED EMBODIMENTS

Next, embodiments of the present invention will be described with reference to drawings.

Figure 1:
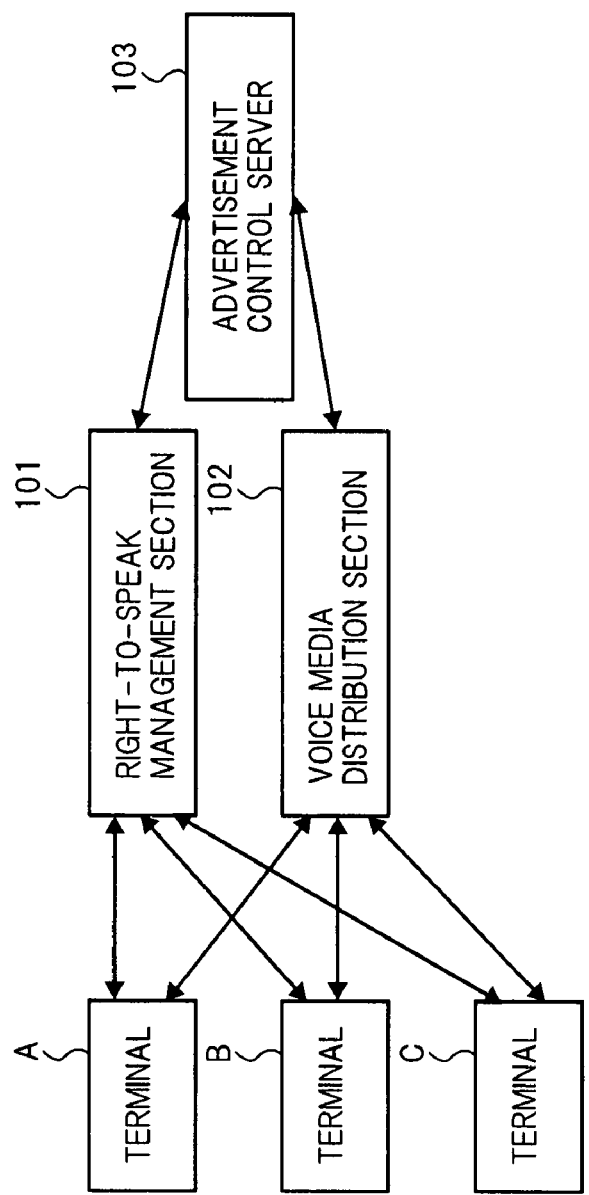
FIG. 1 is a block diagram showing the configuration of main components of an embodiment according to the present invention.
Figure 2:
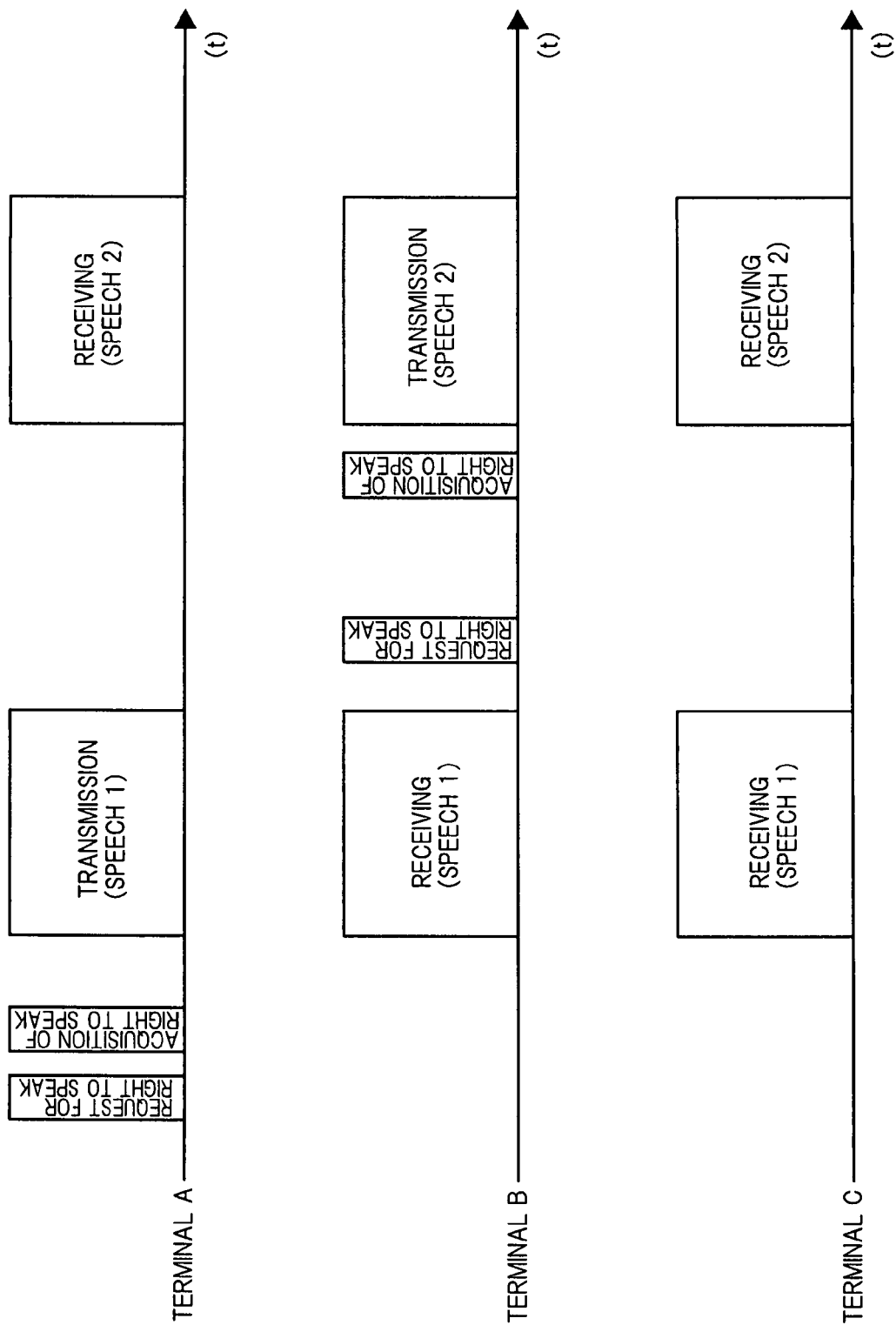
FIG. 2 is a signal diagram showing the operation of the embodiment according to the present invention.

FIG. 1 is a block diagram showing the operation of an embodiment according to the present invention, and FIG. 2 is a signal diagram showing the session state of a normal PoC communication service provided in the embodiment shown in FIG. 1.

As shown in FIG. 1, the system of this embodiment is configured by terminals A, B and C, a right-to-speak management section 101 for managing the right to speak in PoC communication, voice media distribution section 102 for transmitting and receiving data to and from terminals A, B and C, and advertisement control server 103 for storing advertisement data and distributing the advertisement data to the respective terminals via voice media distribution section 102.

Each of the terminals A, B and C and the advertisement control server 103 is connected to right-to-speak management section 101 and voice media distribution section 102.

In the state shown in FIG. 2, the three terminals A, B and C perform a session via a PoC communication service.

First, terminal A requests the right to speak from right-to-speak management section 101, and transmits the data of speech 1 after acquiring the right to speak.

The data of speech 1 is transmitted to terminals B and C. When transmission of the data of speech 1 ends, terminal B requests the right to speak from right-to-speak management section 101, and transmits the data of speech 2 after acquiring the right to speak. The data of speech 2 is transmitted to terminals A and C.

In this way, voice communication is realized via half-duplex communication.

Figure 3:
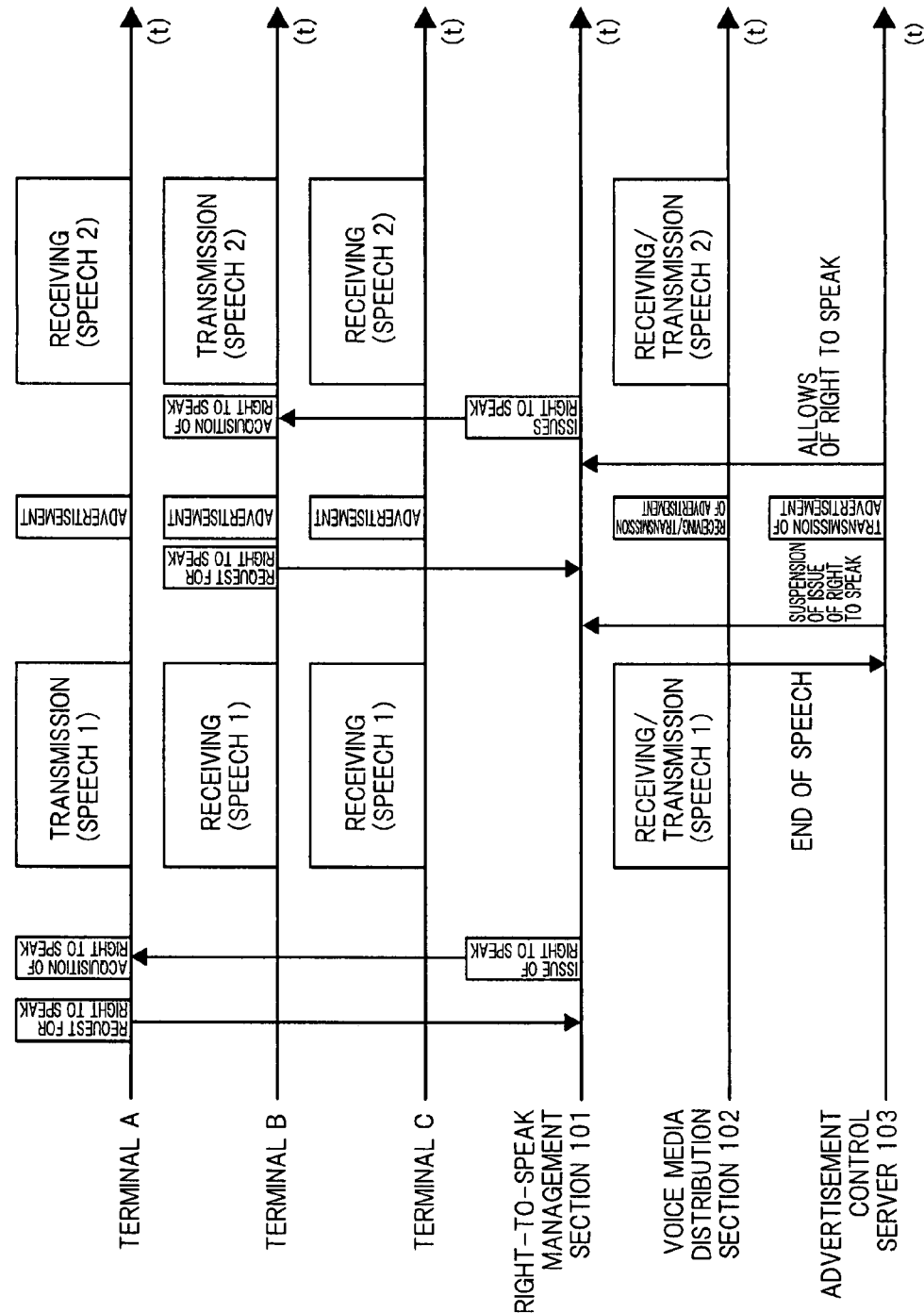
FIG. 3 is a signal diagram showing the operation of an embodiment according to the present invention.

FIG. 3 is a signal diagram showing an embodiment of the present invention.

First, terminal A requests the right to speak from right-to-speak management section 101, and transmits the data of speech 1 after acquiring the right to speak. The data of speech 1 is transmitted to terminals B and C.

When the transmission of the data of speech 1 from the terminal A ends, voice media distribution section 102 transmits an end-of-speech notification to the advertisement control server 103 indicating that the speech has ended.

Upon receiving the end-of-speech notification, advertisement control server 103 instructs right-to-speak management section 101 to suspend issuing of the right to speak.

Right-to-speak management section 101, which has been instructed to suspend issue of the right to speak, temporarily suspends a response to a request for the right to speak transmitted from terminal B.

Advertisement control server 103 transmits advertisement data to voice media distribution section 102, and voice media distribution section 102 transmits the advertisement data to each terminal.

When transmission of the advertisement data ends, advertisement control server 103 instructs right-to-speak management section 101 to allow the right to speak. Right-to-speak management section 101 responds to the request for the right to speak from terminal B which has been withheld and issues the right to speak.

Upon acquiring the right to speak, terminal B transmits the data of speech 2. The data of the speech 2 is transmitted to the terminals A and C.

In the signal diagram described above, processing the requests of each terminal is similar to the procedure shown in FIG. 2. Therefore, it is possible to realize this embodiment by using any terminal that is appropriately configured for a standard PoC communication procedure just by making available right-to-speak management section 101, voice media distribution section 102 and advertisement control server 103 on the server side.

Figure 4:
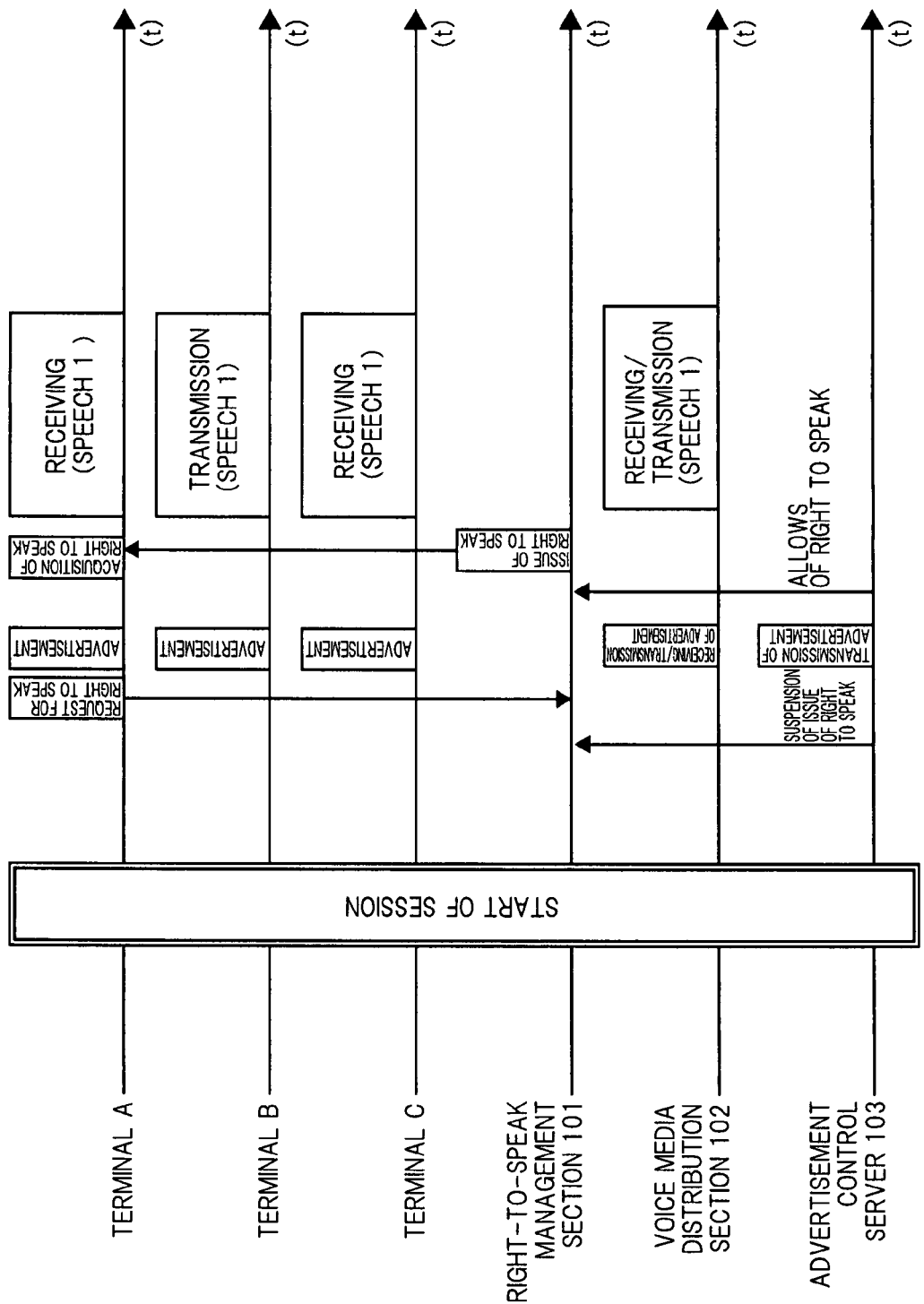
FIG. 4 is a signal diagram showing the operation of an embodiment according to the present invention.

FIG. 4 is a signal diagram showing the operation of another embodiment of the present invention.

In this embodiment, an advertisement is inserted only once immediately after the start of a session.

First, a session is started among the terminals A, B and C. When the PoC communication session is started, the advertisement control server 103 instructs right-to-speak management section 101 to suspend issuing the right to speak.

Right-to-speak management section 101 which has been instructed to suspend issuing of the right to speak, temporarily suspends a response to a request for the right to speak transmitted from the terminal A. Advertisement control server 103 transmits advertisement data to voice media distribution section 102.

Voice media distribution section 102 transmits the advertisement data to each terminal. When transmission of the advertisement data ends, advertisement control server 103 instructs right-to-speak management section 101 to allow the right to speak. Right-to-speak management section 101 responds to the request for the right to speak from the terminal A which has been withheld and issues the right to speak. Upon acquiring the right to speak, terminal B transmits the data of speech 1. The data of the speech 1 is transmitted to terminals A and C.

In the signal diagram described above, processing the request of each terminal is similar to the procedure shown in FIG. 2. Therefore, it is possible to realize this embodiment by using any terminal that is appropriately configured for a standard PoC communication procedure just by making available right-to-speak management section 101, voice media distribution section 102 and advertisement control server 103 on the server side.

Figure 5:
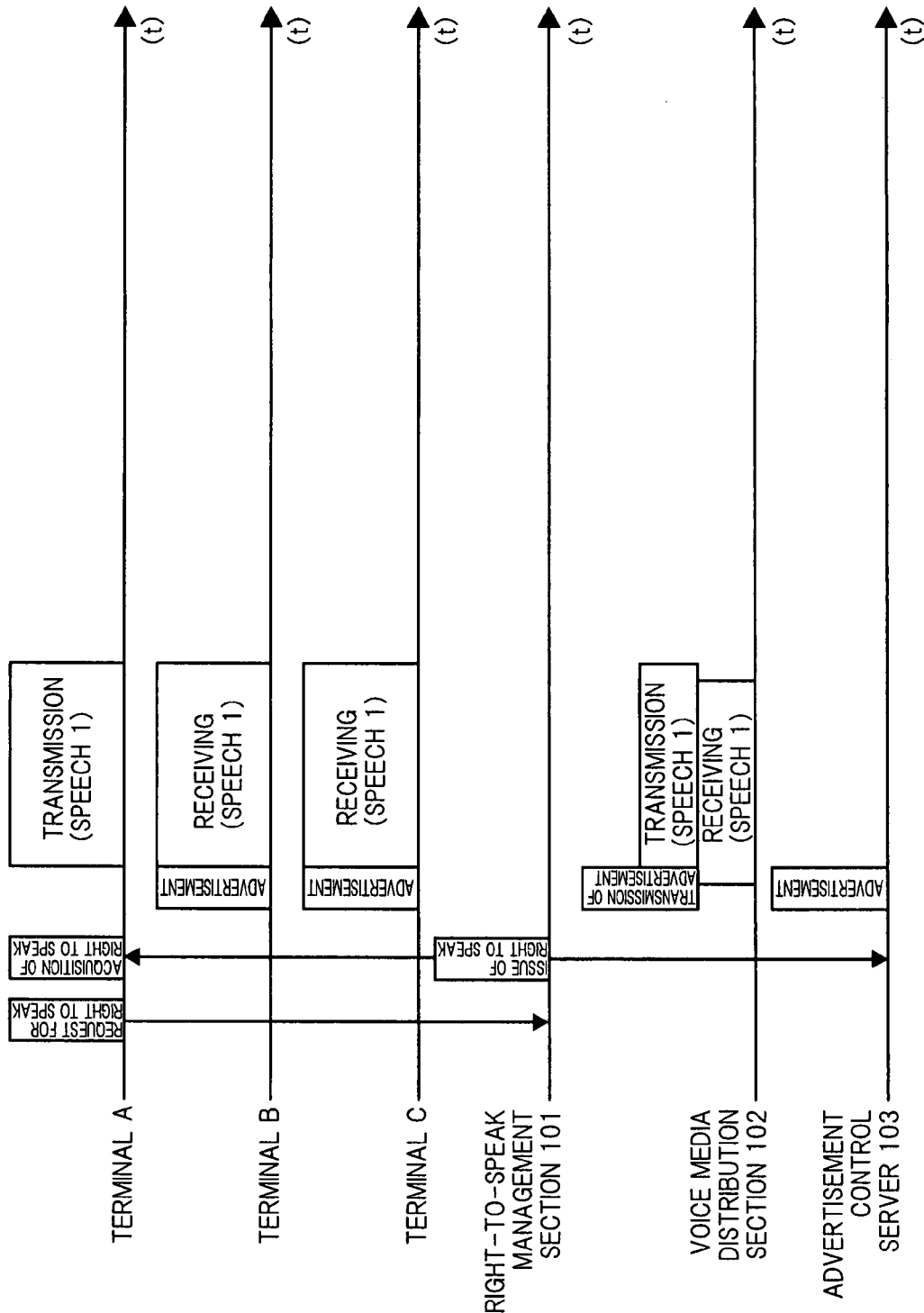
FIG. 5 is a signal diagram showing the operation of an embodiment according to the present invention.

FIG. 5 is a signal diagram showing the operation of another embodiment of the present invention.

In this embodiment, an advertisement is inserted at the beginning of each conversation.

First, terminal A requests the right to speak from right-to-speak management section 101. Right-to-speak management section 101 transmits a right-to-speak issue notification indicating that the right to speak has been issued to the terminal A, and to advertisement control server 103.

Advertisement control server 103 transmits advertisement data to voice media distribution section 102. Voice media distribution section 102 transmits the advertisement data to each terminal. In this case, because terminal A has the right to speak, the advertisement data is not transmitted to terminal A in accordance with the restrictions of half-duplex communication. Terminal A starts transmission of the data of speech 1 because it has the right to speak.

In the case of this embodiment, transmission of the data of speech 1 may be started during delivery of the advertisement data. In this case, voice media distribution section 102 stores the data of speech 1 until delivery of the advertisement data ends, and then delivers the data of speech 1.

In the signal diagram described above, processing the request of each terminal is similar to the procedure shown in FIG. 2. Therefore, it is possible to realize this embodiment by using any terminal that is appropriately configured for a standard PoC communication procedure just by making available right-to-speak management section 101, voice media distribution section 102 and advertisement control server 103 on the server side.

Figure 6:
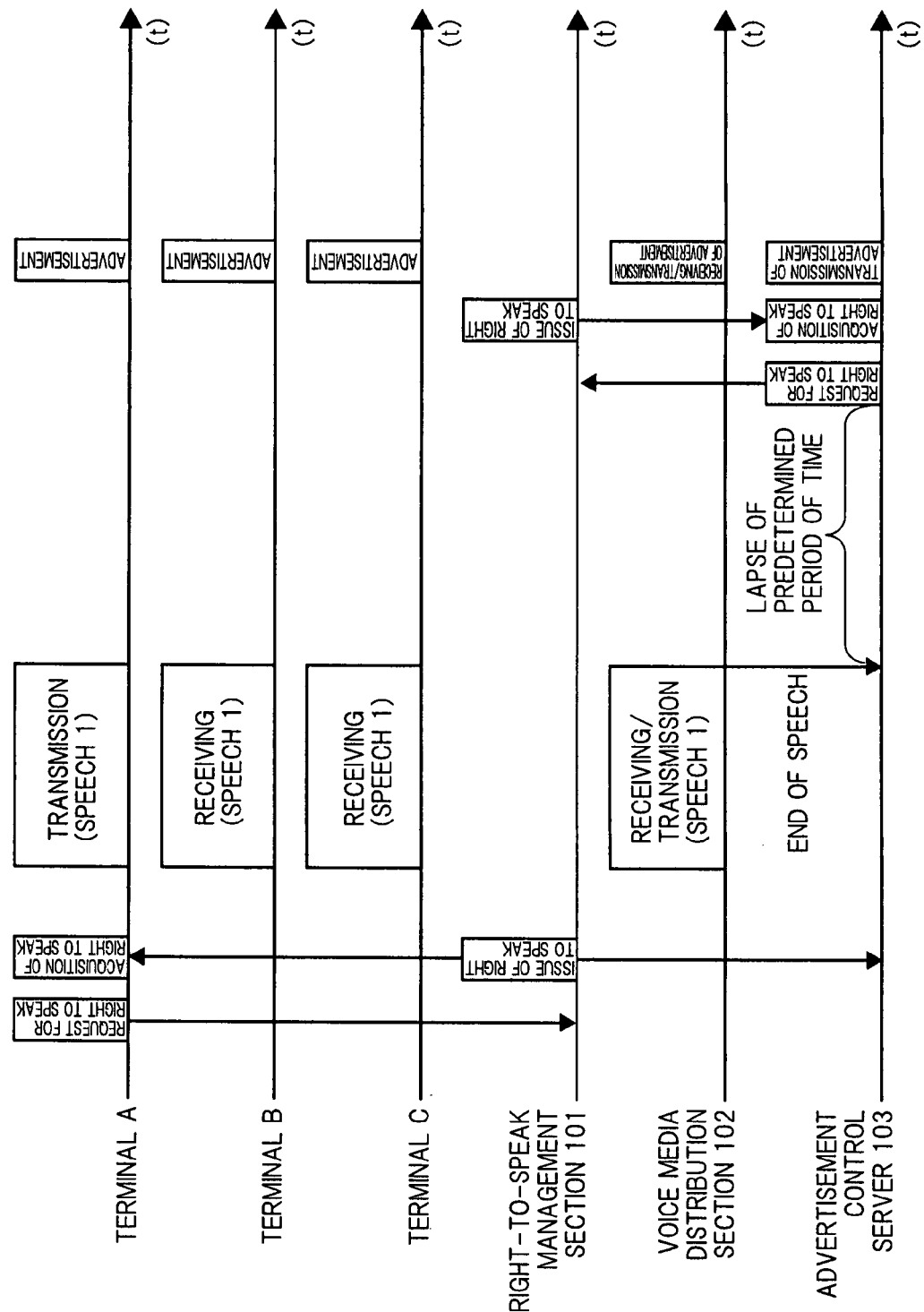
FIG. 6 is a signal diagram showing the operation of an embodiment according to the present invention.

FIG. 6 is a signal diagram showing the operation of another embodiment of the present invention.

In this embodiment, advertisement is inserted when speech has stopped for a predetermined period of time.

First, terminal A requests the right to speak from the right-to-speak management section 101. Right-to-speak management section 101 transmits a right-to-speak issue notification indicating that the right to speak has been issued to terminal A, and to advertisement control server 103. Terminal A starts transmission of the data of speech 1 because it has the right to speak.

Voice media distribution section 102 delivers the data of speech 1 to terminals B and C. When delivery of the data of speech 1 ends, voice media distribution section 102 transmits an end-of-speech notification indicating that the delivery of the speech has ended, to the advertisement control server 103.

If the next right-to-speak issue notification is not accepted when a predetermined period of time has elapsed after accepting the end-of-speech notification, advertisement control server 103 requests the right to speak from right-to-speak management section 101. When advertisement control server 103 can acquire the right to speak, it transmits advertisement data to voice media distribution section 102. Voice media distribution section 102 delivers the advertisement data to terminals A, B and C.

In the signal diagram described above, the processing the requests of each terminal is similar to the procedure shown in FIG. 2. Therefore, it is possible to realize this embodiment by using any terminal that is appropriately configured for a standard PoC communication procedure just by making available right-to-speak management section 101, voice media distribution section 102 and advertisement control server 103 on the server side.

Figure 7:
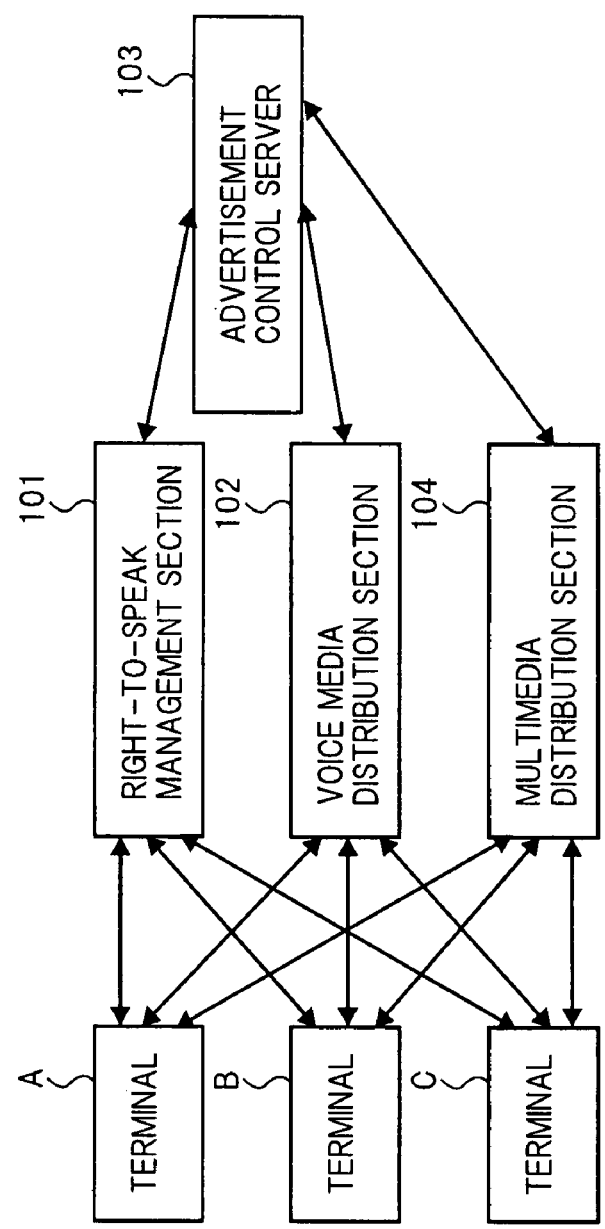
FIG. 7 is a block diagram showing the configuration of main components of an embodiment according to the present invention.

FIG. 7 is a block diagram showing the configuration of another embodiment of the present invention. In this embodiment, the PoC communication service is extended so that not only voice media but also multimedia can be handled, and multimedia distribution section 104 for distributing pictures and the like is also provided in addition to the configuration shown in FIG. 1.

Each of terminals A, B and C and advertisement control server 103 is connected to right-to-speak management section 101, voice media distribution section 102 and multimedia distribution section 104.

Figure 8:
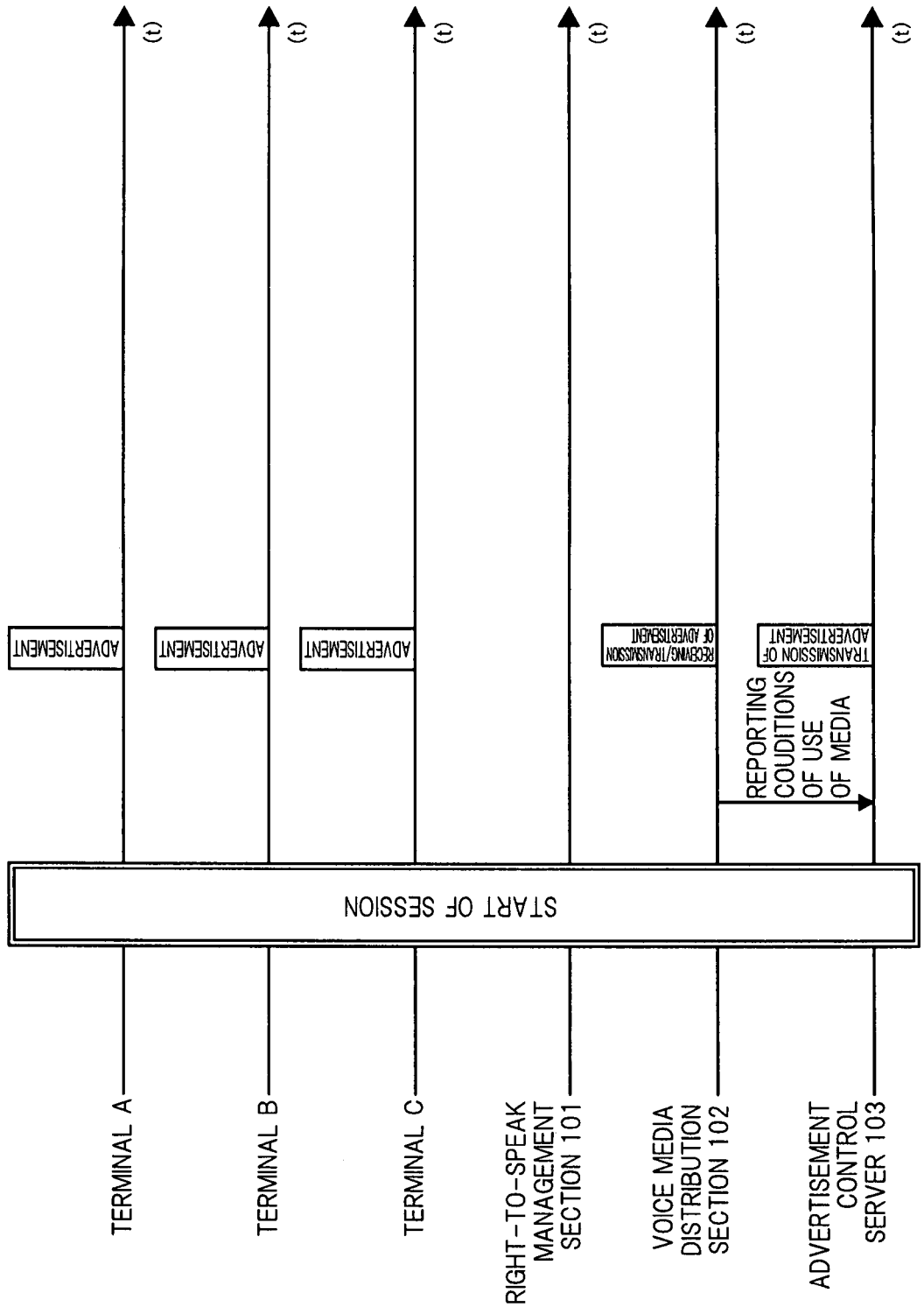
FIG. 8 is a signal diagram showing the operation of the embodiment according to the present invention.

FIG. 8 is a signal diagram showing the operation of this embodiment.

When a session starts, the multimedia distribution section 104 notifies advertisement control server 103 of the conditions under which multimedia may be used. Advertisement control server 103 specifies a medium which is not used in the session and transmits advertisement data, and multimedia distribution section 104 transmits the advertisement data to terminals A, B and C.

Though an advertisement is transmitted at a timing independent from the timings of the right to speak, speech and start of the session in this embodiment, it is also possible to transmit advertisement data at the timings shown in FIGS. 3, 4, 5 and 6.

The present invention is not limited to the embodiments described above. For example, the terminal may not only be a mobile phone but also a fixed terminal or some other kind of device or communication method that is realized by software of a PC. The terminal may be such that is not operated by a person. Furthermore, though the number of the terminals is assumed to be three in the embodiments, the number may be two, four or more.

Furthermore, though right-to-speak management section 101, voice media distribution section 102 and advertisement control server 103 have been shown as independent units, it is of course possible to provide them in a server to manage PoC communication. Though multimedia distribution section 104 and voice media distribution section 102 are shown as being independently provided, they may be in the same distribution section.

The present invention is a technique for inserting an advertisement in PoC communication, and therefore, it is conceivable that the communication fee will charged to the provider of the advertisement. As for the debit form to be used in this case, a business model for services and content that is provided on the Web can be applied.

For example, it is possible that a user selects a normal debit form in which the fee is charged on the calling side, the called side or both sides, or an accounting form in which the PoC communication fee is free or discounted, or a coupon or the like is issued by insertion of an advertisement according to the present invention.

A model is also conceivable in which the above accounting systems can be switched as specified by the system. For example, it is conceivable that the mode is switched to the advertisement mode when the prepaid fee runs out and that, when a user feels annoyed by the advertisement and accepts charges, the model is switched to the normal mode.

While preferred embodiments of the present invention have been described using specific terms, such description is for illustrative purposes only, and it is to be understood that changes and variations may be made without departing from the spirit or scope of the following claims.

What is claimed is:

1. A server for managing PoC communication among multiple terminals, comprising:
   a right-to-speak management section for managing the right to speak of the multiple terminals;
   a data distribution section for transmitting and receiving data to and from the multiple terminals; and
   an advertisement control section for storing advertisement data and transmitting the stored advertisement data to the multiple terminals via the data distribution section.

2. The server according to claim 1, wherein
   when receiving speech data by any of the multiple terminals ends, the data distribution section transmits an end-of-speech notification to that effect to the advertisement control section, and when accepting advertisement data from the advertisement control section, the data distribution section transmits the advertisement data to each of the multiple terminals; and
   when accepting the end-of-speech notification, the advertisement control section causes the right-to-speak management section to suspend a response to the request for the right to speak by each terminal and transmits the stored advertisement data to the data distribution section.

3. The server according to claim 1, wherein
   when a PoC communication session is started, the advertisement control section causes the right-to-speak management section to suspend a response to the request for the right to speak by the multiple terminals and transmits the stored advertisement data to the data distribution section; and
   when accepting the advertisement data from the advertisement control section, the data distribution section transmits the advertisement data to each of the multiple terminals.

4. The server according to claim 1, wherein
   when issuing the right to speak to any of the multiple terminals, the right-to-speak management section transmits a right-to-speak issue notification to that effect to the advertisement control section;
   when accepting the right-to-speak issue notification, the advertisement control section transmits the stored advertisement data to the data distribution section; and
   when accepting advertisement data from the advertisement control section, the data distribution section transmits the advertisement data and speech data from the terminal to which the right to speak has been issued to each of the terminals other than the terminal to which the right to speak has been issued.

5. The server according to claim 1, wherein
   when issuing the right to speak to any of the multiple terminals, the right-to-speak management section transmits a right-to-speak issue notification to that effect to the advertisement control section;
   when receiving speech data by any of the multiple terminals ends, the data distribution section transmits an end-of-speech notification to that effect to the advertisement control section, and when accepting advertisement data from the advertisement control section, the data distribution section transmits the advertisement data to each of the multiple terminals; and
   if the right-to-speak issue notification is not accepted even when a predetermined time has lapsed after acceptance of the end-of-speech notification, the advertisement control section requests the right to speak from the right-to-speech management section, and transmits the stored advertisement data to the data distribution section if the right to speak has been acquired.

6. The server as in any of claims 1 to 5, wherein advertisement data includes picture data, and the data distribution section specifies a medium which is not used by the PoC communication and transmits the advertisement data to each terminal.

7. An advertisement insertion method to be performed in a server comprising:
   a right-to-speak management section for managing PoC communication among multiple terminals and for managing the right to speak of the multiple terminals;
   a data distribution section for transmitting and receiving data to and from the multiple terminals; and
   an advertisement control section for storing advertisement data; wherein
   the advertisement control section transmits the stored advertisement data to the multiple terminals via the data distribution section.

8. The advertisement insertion method according to claim 7, wherein
   when receiving speech data by any of the multiple terminals ends, the data distribution section transmits an end-of-speech notification to that effect to the advertisement control section, and when accepting advertisement data from the advertisement control section, the data distribution section transmits the advertisement data to each of the multiple terminals; and
   when accepting the end-of-speech notification, the advertisement control section causes the right-to-speak management section to suspend a response to the request for the right to speak by each terminal and transmits the stored advertisement data to the data distribution section.

9. The advertisement insertion method according to claim 7, wherein
   when a PoC communication session is started, the advertisement control section causes the right-to-speak management section to suspend a response to the request for the right to speak by the multiple terminals and transmits the stored advertisement data to the data distribution section; and when accepting the advertisement data from the advertisement control section, the data distribution section transmits the advertisement data to each of the multiple terminals.

10. The advertisement insertion method according to claim 7, wherein when issuing the right to speak to any of the multiple terminals, the right-to-speak management section transmits a right-to-speak issue notification to that effect to the advertisement control section;

when accepting the right-to-speak issue notification, the advertisement control section transmits the stored advertisement data to the data distribution section; and when accepting the advertisement data from the advertisement control section, the data distribution section transmits the advertisement data and speech data from the terminal to which the right to speak has been issued to each of the terminals other than the terminal to which the right to speak has been issued.

11. The advertisement insertion method according to claim 7, wherein when issuing the right to speak to any of the multiple terminals, the right-to-speak management section transmits a right-to-speak issue notification to that effect to the advertisement control section;

when receiving of speech data by any of the multiple terminals ends, the data distribution section transmits an end-of-speech notification to that effect to the advertisement control section, and when accepting advertisement data from the advertisement control section, the data distribution section transmits the advertisement data to each of the multiple terminals; and if the right-to-speak issue notification is not accepted even when a predetermined time has lapsed after acceptance of the end-of-speech notification, the advertisement control section requests the right to speak from the right-to-speech management section, and transmits the stored advertisement data to the data distribution section if the right to speak has been acquired.

12. The advertisement insertion method as in any of claims 7 to 11, wherein advertisement data includes picture data, and the data distribution section specifies a medium which is not used by the PoC communication and transmits the advertisement data to each terminal.

* * * * *